B. J. GREER.
LOCK NUT.
APPLICATION FILED OCT. 1, 1919.
1,331,011.
Patented Feb. 17, 1920.
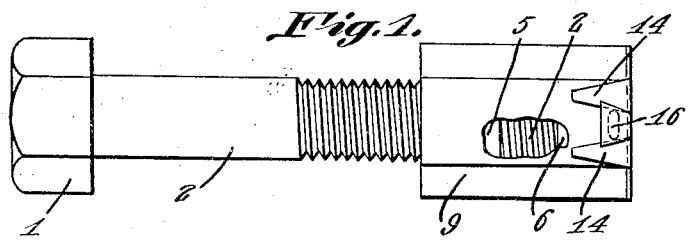
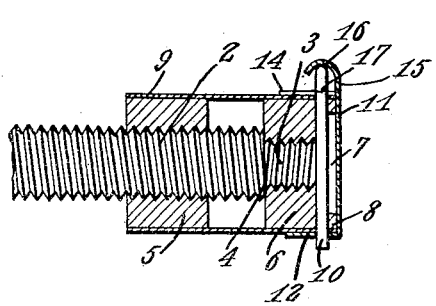
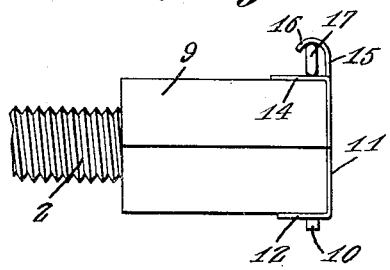
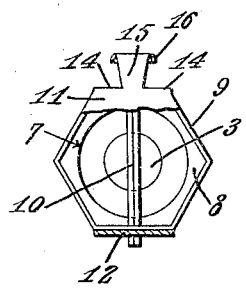
B. J. Greer, Inventor

UNITED STATES PATENT OFFICE.

BENJAMIN J. GREER, OF POYNOR, TEXAS.

LOCK-NUT.

1,331,011.  Specification of Letters Patent.  Patented Feb. 17, 1920.

Application filed October 1, 1919. Serial No. 327,671.

*To all whom it may concern:*

Be it known that I, BENJAMIN J. GREER, a citizen of the United States, residing at Poynor, in the county of Henderson and State of Texas, have invented a new and useful Lock-Nut, of which the following is a specification.

The device forming the subject matter of this application is a nut lock and the invention aims to provide novel means whereby one nut of a pair may be held against rotation by the other nut of the pair, it being possible to adjust the first specified nut as occasion may demand.

It is within the province of the disclosure to improve generally and to enhance the utility of devices of that type to which the invention appertains.

With the above and other objects in view, which will appear as the description proceeds, the invention resides in the combination and arrangement of parts and in the details of construction hereinafter described and claimed, it being understood that, within the scope of what is claimed, changes in the precise embodiment of the invention shown can be made without departing from the spirit of the invention.

In the accompanying drawings:—

Figure 1 shows in side elevation, a device constructed in accordance with the invention, parts being broken away; Fig. 2 is a fragmental longitudinal section; Fig. 3 is a fragmental side elevation wherein the device is viewed at right angles to the showing of Fig. 1; and Fig. 4 is an end elevation, wherein a portion of the cap has been broken away.

The numeral 1 denotes a bolt having a shank 2 embodying a reduced tip 3 defining a shoulder 4, the shank and the tip being threaded in opposite directions. A first nut 5 is mounted on the threaded portion of the shank 2, and a second nut 6 is mounted on the tip 3, the nuts being of the same cross section. In the outer end of the second nut 6 there is a recess 7 defining a marginal flange 8.

A tubular casing 9 receives the nuts 5 and 6, the casing conforming in cross section to the cross section of the nuts, so that the nuts cannot rotate independently of the casing. A retainer, such as a cotter pin 10, is inserted removably through the casing 9, transversely thereof, and through the flange 8 of the nut 6, the cotter pin extending along the base of the recess 7 in the nut 6.

A cap plate 11 is mounted on the outer end of the casing 9 and is supplied with a tongue 12 engaging the casing 9. Fingers 14 are located on the cap plate 11 at a point opposite to the tongue 12, the fingers engaging the casing 9. Between the fingers 14, the cap plate 11 is supplied with an outstanding keeper 15, including a bendable end 16, engaging the extremity of the cotter pin 10 and preferably bent to extend beneath the head 17 of the cotter pin.

The nut 5 may be adjusted to any desired position along the shank 2 of the bolt. The nut 6 is then threaded on the tip 3 and seats against the shoulder 4. The nuts 5 and 6 are then inclosed within the casing 9. Because the nuts are oppositely threaded on the bolt 1 and because the nuts are received within the casing 9, the nut 5 cannot rotate. Further, the casing 9 cannot slide off the nuts 5 and 6, because the casing is engaged by the cotter pin 10, which, in its turn, is mounted in the nut 6. The cotter pin holds the cap plate 11 in place and the cap plate closes the outer end of the casing 9. The cap plate cannot slide transversely, at right angles to the axis of the cotter pin 10, because the cotter pin is engaged between the fingers 14 and because the cotter pin passes through the tongue 12. The cotter pin cannot move endwise, because the head 17 of the cotter pin is engaged by the bendable end 16 of the keeper 15 on the cap plate.

Having thus described the invention, what is claimed is:—

1. In a nut lock, a bolt having oppositely threaded parts; inner and outer nuts on said parts; a tubular casing within which the nuts fit against rotation; a removable retainer connecting the casing with the outer nut; and a cap held on the casing by the retainer, the cap embodying means for holding the retainer in place.

2. In a nut lock, a bolt having oppositely threaded parts; inner and outer nuts on said parts; a tubular casing within which the nuts fit against rotation; a removable retainer connecting the casing and the outer nut; and a cap on the casing, the cap being provided with a tongue through which one end of the retainer passes, and being provided with a bendable keeper engaging the other end of the retainer to prevent the withdrawal thereof.

In testimony that I claim the foregoing as my own, I have hereto affixed my signature in the presence of two witnesses.

BENJAMIN J. GREER.

Witnesses:
P. K. PHILLIPS,
S. H. ROBERTS.